US009145844B2

(12) United States Patent
Douglas et al.

(10) Patent No.: US 9,145,844 B2
(45) Date of Patent: Sep. 29, 2015

(54) FUEL CONTROL SYSTEMS AND METHODS FOR COLD STARTS OF AN ENGINE

(71) Applicant: GM GLOBAL TECHNOLOGY OPERATIONS LLC, Detroit, MI (US)

(72) Inventors: Scot A. Douglas, Howell, MI (US); Jonathan T. Shibata, Whitmore Lake, MI (US)

( * ) Notice: Subject to any disclaimer, the term of this patent is extended or adjusted under 35 U.S.C. 154(b) by 471 days.

(21) Appl. No.: 13/716,921

(22) Filed: Dec. 17, 2012

(65) Prior Publication Data

US 2014/0121944 A1 May 1, 2014

Related U.S. Application Data

(60) Provisional application No. 61/720,023, filed on Oct. 30, 2012.

(51) Int. Cl.

*B60T 7/12* (2006.01)
*F02D 45/00* (2006.01)
*F02D 41/06* (2006.01)
*F02D 41/38* (2006.01)
*F02D 41/00* (2006.01)

(52) U.S. Cl.

CPC ............ *F02D 45/00* (2013.01); *F02D 41/0025* (2013.01); *F02D 41/0027* (2013.01); *F02D 41/064* (2013.01); *F02D 41/3845* (2013.01)

(58) Field of Classification Search

CPC ....... F02D 41/38; F02D 41/3845; F02N 9/00; F02N 2200/02
USPC ............... 701/103, 104, 111, 112; 123/179.1, 123/179.9, 179.14, 481, 435, 456, 457, 382
See application file for complete search history.

(56) References Cited

U.S. PATENT DOCUMENTS

| | | | | |
|---|---|---|---|---|
| 8,433,496 | B2 * | 4/2013 | Carr et al. | 701/103 |
| 8,950,379 | B2 * | 2/2015 | Hattar et al. | 123/456 |
| 2012/0185152 | A1 * | 7/2012 | Shibata et al. | 701/103 |

* cited by examiner

*Primary Examiner* — John Kwon

(57) ABSTRACT

A control system includes a starter control module, a mode setting module, a fuel pressure control module, and a fuel control module. The starter control module initiates cranking of a spark ignition direct injection (SIDI) engine in response to user actuation of an ignition switch. The mode setting module sets a mode of operation to a cold start mode when an engine coolant temperature is less than a predetermined temperature during the cranking. The fuel pressure control module, in response to the setting of the mode to the cold start mode, determines a target fuel rail pressure. The fuel control module controls fueling during the cranking based on the target fuel rail pressure.

18 Claims, 3 Drawing Sheets

FUEL CONTROL SYSTEMS AND METHODS FOR COLD STARTS OF AN ENGINE

CROSS-REFERENCE TO RELATED APPLICATIONS

This application claims the benefit of U.S. Provisional Application No. 61/720,023, filed on Oct. 30, 2012. The disclosure of the above application is incorporated herein by reference in its entirety.

FIELD

The present disclosure relates to internal combustion engines and more particularly to engine control systems and methods for cold engine startups.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion (IC) engines combust air and fuel within cylinders to produce drive torque. Air flow into an engine may be regulated via a throttle valve. A fuel control system controls fuel injection amount and timing. Increasing the amount of air and fuel provided to the cylinders generally increases the torque output of the engine.

Spark ignition direct injection (SIDI) engines have improved fuel economy and increased power over port fuel-injected combustion engines. A fuel system of an SIDI engine may include a low-pressure fuel pump and a high-pressure fuel pump. The low-pressure fuel pump pumps fuel from a fuel tank to a low-pressure fuel line. The high-pressure fuel pump, which is mechanically driven by the engine, pumps fuel from the low-pressure fuel line to a high-pressure fuel line and/or fuel rail. Fuel injectors of the SIDI engine receive fuel from the fuel rail and inject fuel directly into cylinders of the SIDI engine.

SUMMARY

A cold start control system for a vehicle includes a starter control module, a mode setting module, a fuel pressure control module, and a fuel control module. The starter control module initiates cranking of a spark ignition direct injection (SIDI) engine in response to user actuation of an ignition switch. The mode setting module sets a mode of operation to a cold start mode when an engine coolant temperature is less than a predetermined temperature during the cranking. The fuel pressure control module, in response to the setting of the mode to the cold start mode, determines a target fuel rail pressure. The fuel control module controls fueling during the cranking based on the target fuel rail pressure.

In other features, the cold start control system further includes a parameter determination module that determines a percentage of ethanol in fuel within a fuel tank. The mode setting module sets the predetermined temperature based on the percentage of ethanol.

In still other features, the predetermined temperature is less than a flash point temperature of fuel within a fuel tank.

In further features, the predetermined temperature is one of less than and equal to 18 degrees Celsius.

In still further features, the fuel includes at least one of ethanol, methanol, liquefied petroleum gas (LPG), propane, and butane.

In other features, the fuel pressure control module determines a target equivalence ratio (EQR) based on the target fuel rail pressure. The fuel control module controls the fueling during the cranking based on the target EQR.

In still other features, the fuel pressure control module determines the target EQR further based on the engine coolant temperature.

In further features, the fuel pressure control module determines the target EQR further based on an estimated temperature of a wall of a cylinder of the SIDI engine.

In still further features, the fuel pressure control module determines the target EQR further based on the engine coolant temperature and an estimated temperature of a wall of a cylinder of the SIDI engine.

A cold start control method for a vehicle includes: initiating cranking of a spark ignition direct injection (SIDI) engine in response to user actuation of an ignition switch and setting a mode of operation to a cold start mode when an engine coolant temperature is less than a predetermined temperature during the cranking. The cold start control method further includes: in response to the setting of the mode to the cold start mode, determining a target fuel rail pressure and controlling fueling during the cranking based on the target fuel rail pressure.

In other features, the cold start control method further includes: determining a percentage of ethanol in fuel within a fuel tank; and setting the predetermined temperature based on the percentage of ethanol.

In still other features, the predetermined temperature is less than a flash point temperature of fuel within a fuel tank.

In further features, the predetermined temperature is one of less than and equal to 18 degrees Celsius.

In still further features, the fuel includes at least one of ethanol, methanol, liquefied petroleum gas (LPG), propane, and butane.

In other features, the cold start control method further includes: determining a target equivalence ratio (EQR) based on the target fuel rail pressure; and controlling the fueling during the cranking based on the target EQR.

In still other features, the cold start control method further includes: determining the target EQR further based on the engine coolant temperature.

In further features, the cold start control method further includes: determining the target EQR further based on an estimated temperature of a wall of a cylinder of the SIDI engine.

In still further features, the cold start control method further includes: determining the target EQR further based on the engine coolant temperature and an estimated temperature of a wall of a cylinder of the SIDI engine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
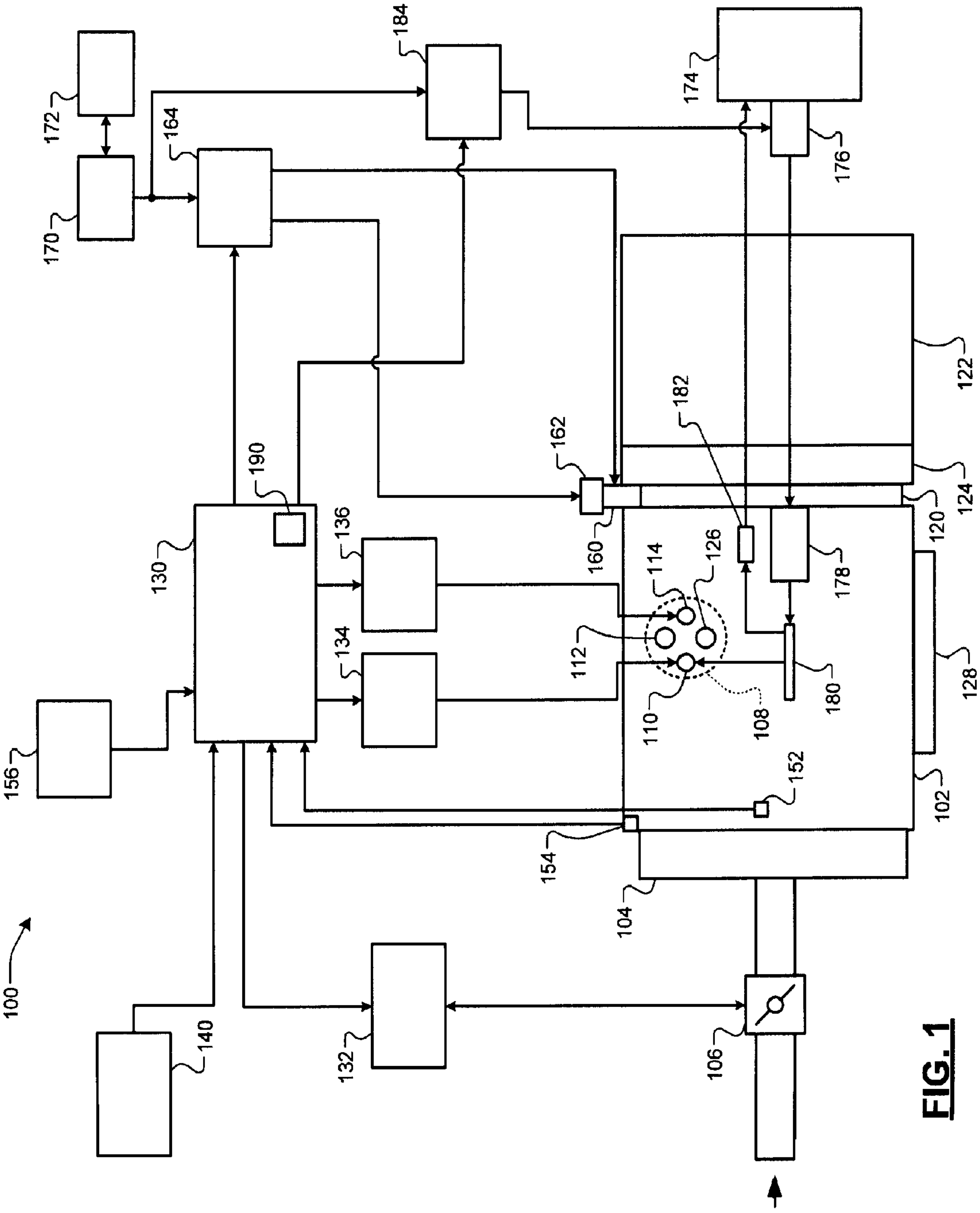
FIG. 1 is a functional block diagram of an example spark ignition direct injection (SIDI) engine system according to the present disclosure.

A spark ignition direct injection (SIDI) engine combusts air and fuel to generate drive torque for a vehicle. Fuel injectors of the SIDI engine receive fuel at a high-pressure from the fuel rail. The fuel is injected directly into cylinders of SIDI engines. The fuel may be gasoline, a mixture of gasoline and ethanol, a mixture of methanol and ethanol, or another suitable type of fuel.

A control module selectively starts an SIDI engine in response to user actuation of an ignition input, such as an ignition key or button, or in response to initiation of an auto-start event. The control module controls various operating parameters during startup of the SIDI engine and while the SIDI engine is ON (running) after startup. For example, the control module controls opening of a throttle valve, fuel injection amount and timing, spark timing, and other suitable operating parameters. The control module also selectively shuts down the SIDI engine in response to user actuation of an ignition input or in response to initiation of an auto-stop event.

Fuel droplet size, measured by the Sauter mean diameter (SMD), affects fuel vaporization. The smaller the fuel droplet, the more active surface area is available and the more easily the fuel droplet will vaporize and combust. Forcing fuel through small orifices such as the fuel rail at high pressure decreases the fuel droplet SMD.

Different types of fuel have different flash point temperatures. For example, ethanol has a higher flash point temperature than gasoline. The flash point temperature of a fuel may refer to a minimum temperature at which the fuel can vaporize to form an ignitable mixture in air. At temperatures that are less than the flash point temperature of the fuel that is directly injected into the SIDI engine, the fuel may be unable to vaporize during startup, and the SIDI engine may be unable to start.

One or more auxiliary devices can be added to facilitate startup of the SIDI engine at temperatures that are less than the flash point temperature of the fuel. For example, a block heater and/or a fuel rail heater or a fuel injector heater may be added to warm the fuel. Warming the fuel may enable the fuel to vaporize sufficiently to allow startup of the SIDI engine at temperatures that are less than the flash point temperature of the fuel. For another example, as gasoline has a low flash point temperature relative to other types of fuels, a separate gasoline tank and a gasoline injector can be added for use during startup. Adding one or more auxiliary devices, however, increases vehicle cost.

According to the present disclosure, no auxiliary devices are added. Instead, at temperatures that are at or less than the flash point temperature of the fuel that is directly injected into the cylinders of the SIDI engine, the control module selectively controls the amount of fuel injected during engine cranking to maintain a target fuel rail pressure. Maintaining the target fuel rail pressure maintains a small fuel droplet SMD, thereby increasing vaporization and enabling startup of the SIDI engine.

Referring now to FIG. 1, a functional block diagram of an example engine system 100 is presented. The engine system includes an engine 102 that combusts an air/fuel mixture to produce drive torque for a vehicle. Air is drawn into an intake manifold 104 through a throttle valve 106. The throttle valve 106 regulates air flow into the intake manifold 104. Air within the intake manifold 104 is drawn into cylinders of the engine 102, such as cylinder 108.

One or more fuel injectors, such as fuel injector 110, inject fuel that mixes with air to form an air/fuel mixture. In various implementations, one fuel injector may be provided for each cylinder of the engine 102. The fuel injectors inject fuel directly into the cylinders. Fuel injection may be controlled based on a target air/fuel mixture for combustion, such as a stoichiometric air/fuel mixture. A fuel system provides fuel to the fuel injectors. The fuel system is discussed further below.

An intake valve 112 opens to allow air into the cylinder 108. A piston (not shown) compresses the air/fuel mixture within the cylinder 108. A spark plug 114 initiates combustion of the air/fuel mixture within the cylinder 108. One spark plug may be provided for each cylinder of the engine 102. Combustion of the air/fuel mixture applies force to the piston, and the piston drives rotation of a crankshaft (not shown).

The engine 102 outputs torque via the crankshaft. A flywheel 120 is coupled to the crankshaft and rotates with the crankshaft. Torque output by the engine 102 is selectively transferred to a transmission 122 via a torque transfer device 124. The torque transfer device 124 selectively couples/decouples the transmission 122 to/from the engine 102. The transmission 122 may include, for example, a manual transmission, an automatic transmission, a semi-automatic transmission, an auto-manual transmission, or another suitable type of transmission. The torque transfer device 124 may include, for example, a torque converter and/or one or more clutches.

Exhaust produced by combustion of the air/fuel mixture is expelled from the cylinder 108 via an exhaust valve 126. The exhaust is expelled from the cylinders to an exhaust system 128. The exhaust system 128 may treat the exhaust before the exhaust is expelled from the exhaust system 128. Although one intake and exhaust valve are shown and described as being associated with the cylinder 108, more than one intake and/or exhaust valve may be associated with each cylinder of the engine 102.

An engine control module (ECM) 130 controls various engine actuators. The engine actuators may include, for example, a throttle actuator module 132, a fuel actuator module 134, and a spark actuator module 136. The engine system 100 may also include other engine actuators, and the ECM 130 may control the other engine actuators.

Each engine actuator controls an operating parameter based on a signal from the ECM 130. For example only, based on signals from the ECM 130, the throttle actuator module 132 may control opening of the throttle valve 106, the fuel actuator module 134 may control fuel injection amount and timing, and the spark actuator module 136 may control spark timing.

The ECM 130 may control the engine actuators based on, for example, driver inputs and inputs from various vehicle systems. The vehicle systems may include, for example, a transmission system, a hybrid control system, a stability control system, a chassis control system, and other suitable vehicle systems.

A driver input module 140 may provide the driver inputs to the ECM 130. The driver inputs provided to the ECM 130 may include, for example, an accelerator pedal position (APP), a brake pedal position (BPP), cruise control inputs, and vehicle operation commands. The vehicle operation commands may include, for example, vehicle startup commands and vehicle shutdown commands. The vehicle operation commands may be input by a user via actuation of one or more ignition system inputs. For example, a user may input the vehicle operation commands by actuating an ignition key, one or more buttons/switches, and/or one or more other suitable ignition system inputs.

An engine speed sensor 152 measures rotational speed of the crankshaft and generates an engine speed based on the speed. For example only, the engine speed sensor 152 may generate the engine speed based on rotation of the crankshaft in revolutions per minute (rpm). A coolant temperature sensor 154 measures a temperature of engine coolant and generates an engine coolant temperature (ECT) based on the temperature of the engine coolant. The ECM 130 may also receive operating parameters measured by other sensors 156, such as oxygen in the exhaust, intake air temperature (IAT), mass air flowrate (MAF), oil temperature, manifold absolute pressure (MAP), and/or other suitable parameters. In various implementations, ethanol content may be measured using a sensor.

The ECM 130 selectively shuts down the engine 102 when a user inputs a vehicle shutdown command or in response to initiation of an auto-stop event. For example only, the ECM 130 may disable the injection of fuel, disable the provision of spark, and perform other shutdown operations to shut down the engine 102 in response to receipt of a vehicle shutdown command.

The ECM 130 selectively starts the engine 102. The ECM 130 starts the engine 102 in response to receipt of a vehicle startup command or initiation of an auto-start event. The ECM 130 engages a starter motor 160 with the engine 102 to initiate engine startup. The starter motor 160 may engage the flywheel 120 or other suitable component(s) that drive rotation of the crankshaft.

A starter motor actuator 162, such as a solenoid, selectively engages the starter motor 160 with the engine 102. A starter actuator module 164 controls the starter motor actuator 162 and the starter motor 160 based on signals from the ECM 130. For example only, the ECM 130 may command engagement of the starter motor 160 when the vehicle startup command is received. The starter actuator module 164 selectively applies current to the starter motor 160 when the starter motor 160 is engaged with the engine 102. The application of current to the starter motor 160 drives the starter motor 160, and the starter motor 160 drives the crankshaft.

Once the crankshaft is rotating, the starter motor 160 may be disengaged from the engine 102, and the flow of current to the starter motor 160 may be discontinued. The engine 102 may be deemed running, for example, when the engine speed exceeds a predetermined speed, such as approximately 700 rpm or another suitable speed. The period between when the starter motor 160 is engaged with the engine 102 for starting the engine and when the engine 102 is deemed running may be referred to as engine cranking.

The current provided to the starter motor 160 may be provided by, for example, a battery 170. While only the battery 170 is shown, the battery 170 may include one or more individual batteries that are connected together or one or more other batteries may be provided.

The engine system 100 may include one or more electric motors, such as electric motor (EM) 172. The EM 172 may selectively draw electrical power, for example, to supplement the torque output of the engine 102. The EM 172 may also selectively function as a generator and selectively apply a braking torque to the engine 102 to generate electrical power. Generated electrical power may be used, for example, to charge the battery 170, to provide electrical power to one or more other EMs (not shown), to provide electrical power to other vehicle systems, and/or for other suitable uses.

As mentioned above, the fuel system supplies fuel to the fuel injectors. The fuel system may include a fuel tank 174, a low pressure fuel pump 176, a high pressure fuel pump 178, a fuel rail 180, a pressure relief valve 182, and/or one or more other suitable components. The low pressure fuel pump 176 draws fuel from the fuel tank 174 and provides fuel at low pressures to the high pressure fuel pump 178. The low pressures provided by the low pressure fuel pump 176 are expressed relative to pressurization provided by the high pressure fuel pump 178.

The low pressure fuel pump 176 is an electrically driven fuel pump, and a pump actuator module 184 may control the application of power to the low pressure fuel pump 176 based on signals from the ECM 130. For example only, the ECM 130 may command application of power to the low pressure fuel pump 176 when or before a vehicle startup command is input.

The high pressure fuel pump 178 pressurizes the fuel received from the low pressure fuel pump 176 within the fuel rail 180. The high pressure fuel pump 178 is engine driven, such as by the crankshaft or by a camshaft. The high pressure fuel pump 178 may pump fuel into the fuel rail 180, for example, once, twice, or more per revolution of the crankshaft.

The fuel injectors inject fuel from the fuel rail 180 into the cylinders. The high pressure fuel pump 178 pressurizes the fuel within the fuel rail 180 to pressures that are greater than the pressure within the cylinder during fuel injection. When a pressure in the fuel rail 180 is greater than a predetermined maximum pressure, the pressure relief valve 182 releases fuel back to the fuel tank 174.

As fuel is injected directly into the cylinders and combustion may be initiated via spark, the engine 102 may be referred to as a spark ignition direct injection (SIDI) engine. Flex fuel SIDI engines can combust gasoline, a blend of gasoline and ethanol, or ethanol. An ethanol fuel may be referred to using the prefix E and an integer corresponding to an amount of ethanol in the blend by volume. For example, E85 may refer to a blend of gasoline and ethanol that includes 85 percent ethanol by volume, E50 may refer to a blend of gasoline and ethanol that includes 50 percent ethanol by volume, etc. Pure ethanol may be referred to as E100, and gasoline may be referred to as E0. Other types of fuels that may be combusted by SIDI engines include methanol, other alcohol based fuels, liquefied petroleum gas (LPG), propane, butane, etc.

Flash point temperature of a fuel may refer to a minimum temperature at which the fuel can vaporize to form an ignitable mixture in air. Some fuels, such as gasoline, have a flash point temperature that is less than a predetermined minimum temperature, such as −10 degrees Celsius (° C.). Other fuels, however, have a flash point temperature that is greater than the predetermined minimum temperature. For example only, E100 may have a flash point temperature of approximately 18° C. Fuels having a flash point temperature that is greater than the predetermined minimum temperature may be unable to vaporize and/or combust when the engine 102 is started below, at, or even above the predetermined minimum temperature.

One or more auxiliary devices could be added to the vehicle to enable startup of the engine 102 at temperatures that are less than the flash point temperature of the fuel within the fuel tank 174. For example only, a gasoline injector and a separate gasoline fuel tank can be added, and the gasoline can be injected during engine cranking to enable startup of the engine 102. For another example only, an engine block heater and/or one or more other electrical heaters, such as a fuel rail heater or fuel injector heaters, can be added to warm the fuel to enable startup of the engine 102. The addition of one or more of these auxiliary, startup enabling devices, however, also increases vehicle cost.

In the present application, zero auxiliary devices (e.g., engine block heater, separate gasoline injector, separate gasoline fuel tank, and/or one or more electrical heaters) are included to facilitate engine startup at temperatures that are less than the flash point temperature of the fuel within the fuel tank 174. Instead, at temperatures that are less than the flash point temperature of the fuel within the fuel tank 174, a startup control module 190 selectively controls the amount of fuel injected during engine crank to maintain a target pressure in the fuel rail 180 to enable vaporization of the fuel and to start the engine 102.

Figure 2:
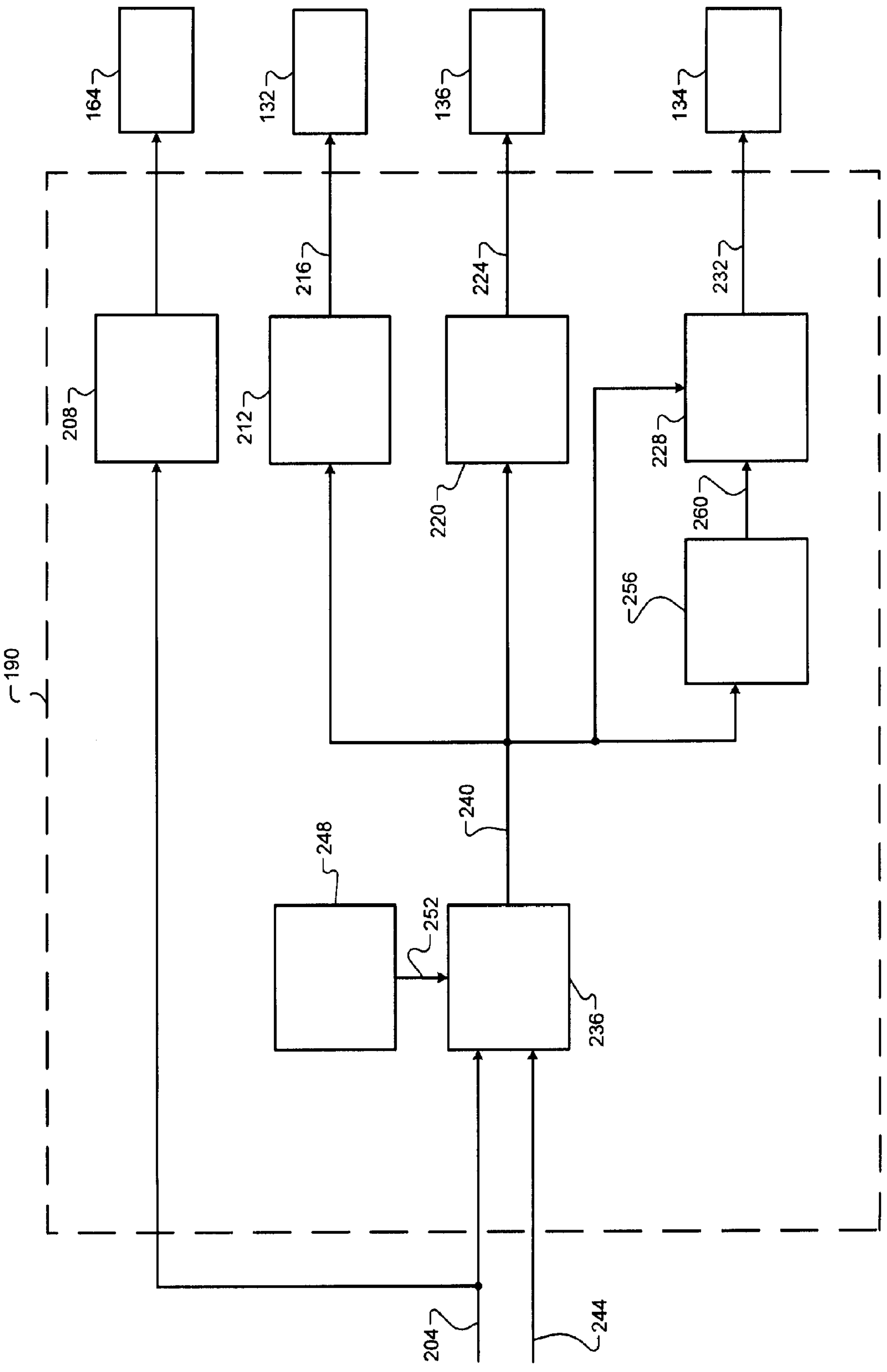
FIG. 2 is a functional block diagram of an example startup control module according to the present disclosure.

Referring now to FIG. 2, a functional block diagram of an example implementation of the startup control module 190 is presented. In response to a user inputting a vehicle startup command 204 while the engine 102 is off, a starter control module 208 commands the starter actuator module 164 to engage the starter motor 160 with the engine 102 and apply power to the starter motor 160. The vehicle startup command 204 may be input by the driver, for example, by actuating one or more ignition inputs.

The starter actuator module 164 engages the starter motor 160 with the engine 102 and applies power to the starter motor 160 in response to the vehicle startup command 204. When engaged with the engine 102 and receiving power, the starter motor 160 drives rotation of the crankshaft. Power is also applied to the low pressure fuel pump 176 during engine cranking. Power may be applied to the low pressure fuel pump 176 beginning before power is applied to the starter motor 160. The low pressure fuel pump 176 may be controlled during engine cranking and while the engine 102 is running based on providing fuel to the high pressure fuel pump 178 at a predetermined low pressure. The high pressure fuel pump 178 increases the pressure of the fuel within the fuel rail 180 as the starter motor 160 drives the crankshaft.

A throttle control module 212 controls opening of the throttle valve 106. The throttle control module 212 may set a target area 216 for the throttle valve 106, and the throttle actuator module 132 may actuate the throttle valve 106 based on the target area 216. A spark control module 220 sets a target spark timing 224, and the spark actuator module 136 generates spark based on the target spark timing 224. A fuel control module 228 controls amount and timing of fuel injection. The fuel control module 228 may set target fueling parameters 232 (e.g., target amount, target timing, target number of pulses, etc.), and the fuel actuator module 134 may control the fuel injectors based on the target fueling parameters 232.

Equivalence ratio (EQR) may refer to the mass ratio of air to fuel. If exactly enough air is provided to completely burn all of the fuel, the ratio of the mixture is referred to as stoichiometric, and the ratio is 1. If twice as much fuel as needed for a stoichiometric mixture were injected, the EQR would be 2.

Reducing the fuel droplet SMD increases vaporization and enables the engine 102 to start. Higher pressure in the fuel rail 180 reduces the fuel droplet SMD. Reducing the EQR increases the pressure in the fuel rail 180 because less fuel will be injected. Conversely, as EQR increases, the amount of fuel injected during engine cranking increases, and the pressure in the fuel rail 180 decreases.

Reducing the amount of fuel injected reduces the EQR, but if the EQR is too low, vaporization and combustion will not occur. Maintaining the target pressure in the fuel rail 180 by controlling the EQR in closed loop decreases the fuel droplet SMD, increases vaporization, and enables the engine 102 to start under cold start conditions.

A mode setting module 236 sets a mode 240 of operation for the engine 102. The mode setting module 236 may set the mode 240 to a cold start mode in response to the receipt of the vehicle startup command 204 and a determination that a temperature is less than a predetermined temperature. For example, the mode setting module 236 may set the mode 240 to the cold start mode when an ECT (engine coolant temperature) 244 is less than the predetermined temperature. The predetermined temperature is less than the flash point temperature of the fuel within the fuel tank 174. The predetermined temperature may be a predetermined value that is less than or equal to 18 degrees Celsius (° C.) or another suitable temperature below which the fuel within the fuel tank 174 may be unable to vaporize during engine cranking. When the temperature is not less than the predetermined temperature, the mode setting module 236 may set the mode 240 to a normal start mode for a normal engine startup.

A parameter determination module 248 determines a characteristic 252 of the fuel within the fuel tank 174. For example only, the parameter determination module 248 may determine a percentage of ethanol in the fuel within the fuel tank 174. The parameter determination module 248 may determine the characteristic 252 of the fuel within the fuel tank 174, for example, based on measurements provided by a fuel characteristic sensor, cylinder pressures, and/or other suitable parameters.

The mode setting module 236 may set the predetermined temperature (used for determining whether to set the mode 240 to the cold start mode) based on the characteristic 252. For example only, the mode setting module 236 may set the predetermined temperature using a function or a mapping (e.g., lookup table) that relates the characteristic 252 of the fuel within the fuel tank 174 to the predetermined temperature.

The throttle control module 212 may control the throttle valve 106 based on the mode 240. The spark control module 220 may control the spark timing based on the mode 240. The fuel control module 228 may control the fueling based on the mode 240. One or more other engine actuators may also be controlled based on the mode 240.

A fuel pressure control module 256 may determine a target EQR 260 necessary to maintain the target pressure in the fuel rail 180 based on the mode 240. When the mode 240 is set to the cold start mode, the fuel pressure control module 256 may set the target pressure in the fuel rail 180 using a function or a mapping (e.g., lookup table) that relates the ECT 244 to the target pressure in the fuel rail 180 for a cold start.

When the mode 240 is set to the cold start mode, the fuel pressure control module 256 may set the target EQR 260 needed to maintain the target pressure in the fuel rail 180 using a function or a mapping (e.g., lookup table) that relates the ECT 244, the target pressure in the fuel rail 180, and a modeled cylinder wall temperature to the target EQR 260. The fuel control module 228 may adjust the fueling parameters 232 and control fuel injection based on the target EQR 260.

The mode setting module 236 may transition the mode 240 from the cold start mode (or the start mode) to an engine running mode when the engine is running after a startup. The mode setting module 236 may transition the mode 240 to the engine running mode, for example, when an engine speed becomes greater than a predetermined speed, such as approximately 700 rpm or another suitable speed. The throttle control module 212, the fuel control module 228, and the spark control module 220 may transition to normal control of the throttle valve 112, fueling, and spark timing, respectively, in response to a transition in the mode 240 to the engine running mode.

Figure 3:
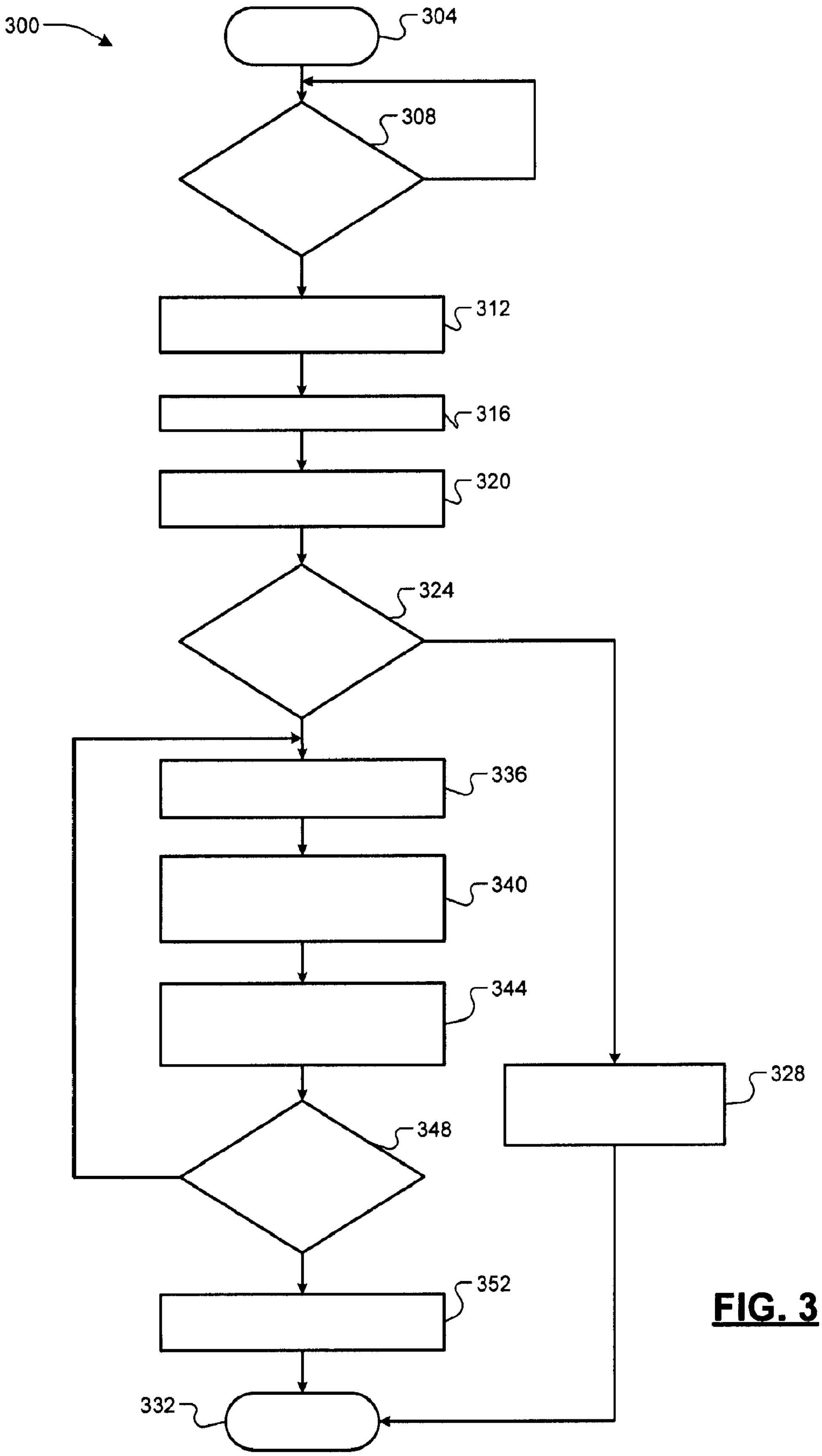
FIG. 3 is a flowchart depicting an example method of performing a cold start of an SIDI engine according to the present disclosure.

Referring now to FIG. 3, a flowchart depicting an example method 300 of performing a cold start of the engine 102 is presented. Control may begin at 304 at a time when the engine 102 is off. The engine 102 may be off, for example, pursuant to a previous vehicle shutdown request. At 308, control determines whether a user has input a vehicle startup command 204. If false, control remains at 308 and waits for a user to input a vehicle startup command 204. If true, control continues at 312. A user may input a vehicle startup command 204 by actuating an ignition switch, an ignition button, a remote-start button, etc.

At 312, control engages the starter motor 160 with the engine 102 and applies power to the starter motor 160. The starter motor 160 drives rotation of the crankshaft of the engine 102. The low pressure fuel pump 176 may be activated to begin pumping fuel to the high pressure fuel pump 178 before the starter motor 160 begins driving the crankshaft. The high pressure fuel pump 178 pumps fuel into the fuel rail 180 as the starter motor 160 drives the crankshaft.

At 316, control obtains a characteristic of the fuel within the fuel tank 174. The characteristic of the fuel may be, for example, an ethanol concentration of the fuel, a flash point temperature of the fuel, or another suitable characteristic of the fuel. At 320, control may set the predetermined temperature used in determining whether the startup of the engine 102 is a cold start based on the characteristic of the fuel. The predetermined temperature is less than the flash point temperature of the fuel and may be less than or equal to +18° C.

At 324, control may determine whether the ECT 244 is less than the predetermined temperature. If false, control may perform a normal startup of the engine 102 at 328, and control may end at 332. If true, control may continue with 336 and perform a cold start of the engine 102.

Maintaining the target pressure in the fuel rail 180 by controlling the target EQR 260 increases vaporization and enables the engine 102 to start under cold start conditions. At 336, control determines the target pressure in the fuel rail 180. For example only, the fuel pressure control module 256 may determine the target pressure in the fuel rail 180 using a function or a mapping (e.g., lookup table) that relates the ECT 244 to the target pressure in the fuel rail 180.

At 340, control determines the target EQR 260 based on the target pressure in the fuel rail 180. For example only, the fuel pressure control module 256 may determine the target EQR 260 using a function or a mapping (e.g., lookup table) that relates the target pressure in the fuel rail 180, the ECT 244, and the modeled cylinder wall temperature to the target EQR 260.

At 344, control regulates the fueling to achieve the target EQR 260. For example, control may command an injection of fuel based on the target EQR 260 or adjust the fueling parameters 232 (such as the timing of the injection, the number of pulses, etc.) based on the target EQR 260.

At 348, control may determine whether the engine 102 is running. If true, control may transition to a normal operation mode at 352, and control may end at 332. If false, control may return to 336 and continue controlling the pressure in the fuel rail 180 for the cold start of the engine 102 to maintain the target pressure in the fuel rail 180. The engine 102 may be deemed running, for example, when the engine speed is greater than the predetermined speed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A cold start control system for a vehicle, comprising:

a starter control module that initiates cranking of a spark ignition direct injection (SIDI) engine in response to user actuation of an ignition switch;

a mode setting module that sets a mode of operation to a cold start mode when an engine coolant temperature is less than a predetermined temperature during the cranking;

a fuel pressure control module that, in response to the setting of the mode to the cold start mode, determines a target fuel rail pressure; and a fuel control module that controls fueling during the cranking based on the target fuel rail pressure.

2. The cold start control system of claim 1 further comprising a parameter determination module that determines a percentage of ethanol in fuel within a fuel tank, wherein the mode setting module sets the predetermined temperature based on the percentage of ethanol.

3. The cold start control system of claim 1 wherein the predetermined temperature is less than a flash point temperature of fuel within a fuel tank.

4. The cold start control system of claim 1 wherein the predetermined temperature is one of less than and equal to 18 degrees Celsius.

5. The cold start control system of claim 1 wherein the fuel includes at least one of ethanol, methanol, liquefied petroleum gas (LPG), propane, and butane.

6. The cold start control system of claim 1 wherein the fuel pressure control module determines a target equivalence ratio (EQR) based on the target fuel rail pressure, and wherein the fuel control module controls the fueling during the cranking based on the target EQR.

7. The cold start control system of claim 6 wherein the fuel pressure control module determines the target EQR further based on the engine coolant temperature.

8. The cold start control system of claim 6 wherein the fuel pressure control module determines the target EQR further based on an estimated temperature of a wall of a cylinder of the SIDI engine.

9. The cold start control system of claim 6 wherein the fuel pressure control module determines the target EQR further based on the engine coolant temperature and an estimated temperature of a wall of a cylinder of the SIDI engine.

10. A cold start control method for a vehicle, comprising:

initiating cranking of a spark ignition direct injection (SIDI) engine in response to user actuation of an ignition switch;

setting a mode of operation to a cold start mode when an engine coolant temperature is less than a predetermined temperature during the cranking;

in response to the setting of the mode to the cold start mode, determining a target fuel rail pressure; and controlling fueling during the cranking based on the target fuel rail pressure.

11. The cold start control method of claim 10 further comprising:

determining a percentage of ethanol in fuel within a fuel tank; and setting the predetermined temperature based on the percentage of ethanol.

12. The cold start control method of claim 10 wherein the predetermined temperature is less than a flash point temperature of fuel within a fuel tank.

13. The cold start control method of claim 10 wherein the predetermined temperature is one of less than and equal to 18 degrees Celsius.

14. The cold start control method of claim 10 wherein the fuel includes at least one of ethanol, methanol, liquefied petroleum gas (LPG), propane, and butane.

15. The cold start control method of claim 10 further comprising:

determining a target equivalence ratio (EQR) based on the target fuel rail pressure; and controlling the fueling during the cranking based on the target EQR.

16. The cold start control method of claim 15 further comprising:

determining the target EQR further based on the engine coolant temperature.

17. The cold start control method of claim 15 further comprising:

determining the target EQR further based on an estimated temperature of a wall of a cylinder of the SIDI engine.

18. The cold start control method of claim 15 further comprising:

determining the target EQR further based on the engine coolant temperature and an estimated temperature of a wall of a cylinder of the SIDI engine.

* * * * *

UNITED STATES PATENT AND TRADEMARK OFFICE

CERTIFICATE OF CORRECTION

PATENT NO. : 9,145,844 B2
APPLICATION NO. : 13/716921
DATED : September 29, 2015
INVENTOR(S) : Scot A. Douglas It is certified that error appears in the above-identified patent and that said Letters Patent is hereby corrected as shown below:

Title Page, Item [73] Assignee, insert the following:
--GM Global Technology Operations LLC, Detroit, MI (US)--

Signed and Sealed this
Ninth Day of August, 2016

Michelle K. Lee

Michelle K. Lee
*Director of the United States Patent and Trademark Office*